United States Patent
Lainio et al.

(10) Patent No.: US 11,356,267 B2
(45) Date of Patent: Jun. 7, 2022

(54) APPARATUS, METHOD AND SOFTWARE FOR ELECTRONIC VOTING DURING WEB CONFERENCE

(71) Applicant: OP OSUUSKUNTA, Helsinki (FI)

(72) Inventors: Harri Lainio, Oulu (FI); Pekka Kaipio, Helsinki (FI); Laura Vuorenoja, Helsinki (FI)

(73) Assignee: OP OSUUSKUNTA, Helsinki (FI)

( * ) Notice: Subject to any disclaimer, the term of this patent is extended or adjusted under 35 U.S.C. 154(b) by 263 days.

(21) Appl. No.: 16/875,023

(22) Filed: May 15, 2020

(65) Prior Publication Data

US 2021/0359858 A1  Nov. 18, 2021

(51) Int. Cl.
*H04L 9/32* (2006.01)
*G07C 13/00* (2006.01)

(52) U.S. Cl.
CPC .......... *H04L 9/3228* (2013.01); *G07C 13/00* (2013.01); *H04L 9/3236* (2013.01);
(Continued)

(58) Field of Classification Search
CPC ..... G07C 13/00; H04L 9/3247; H04L 9/3263; H04L 2209/463
See application file for complete search history.

(56) References Cited

U.S. PATENT DOCUMENTS

| | | | |
|---|---|---|---|
| 2003/0055719 A1* | 3/2003 | Faigle | H04N 21/478 348/E7.071 |
| 2005/0021479 A1 | 1/2005 | Jorba et al. | |

(Continued)

FOREIGN PATENT DOCUMENTS

| | | |
|---|---|---|
| CN | 101335868 | 12/2008 |
| CN | 101631225 | 1/2010 |

(Continued)

OTHER PUBLICATIONS

Fatrah et al. Proof of Concept Blockchain-based Voting System BDIoT'19: Proceedings of the 4th International Conference on Big Data and Internet of Things Oct. 23-24, 2019 (Year: 2019).*

*Primary Examiner* — David J Pearson
(74) *Attorney, Agent, or Firm* — Nixon & Vanderhye PC

(57) ABSTRACT

A user apparatus, a method and software for an electronic voting during a web conference are presented. The method includes: receiving a digital identifier of a user into a digital wallet; receiving a digital voting right into the digital wallet in response to generating a cryptographical proof of the digital identifier and transmitting the cryptographical proof of the digital identifier; receiving a digital ballot into the digital wallet in response to generating a cryptographical proof of the digital voting right and transmitting the cryptographical proof of the digital voting right; machine-reading a digital voting place identifier from a machine-readable code during a web conference; and casting a vote by filling out the digital ballot, generating a cryptographical proof of the digital ballot and transmitting the cryptographical proof of the digital ballot, the digital ballot and the digital voting place identifier; wherein the digital wallet is used with a multi-factor authentication including an authentication of the user with the biometric authentication device, and wherein the digital identifier of the user, the digital voting right and the digital ballot are processed as verifiable credentials.

20 Claims, 8 Drawing Sheets

(52) U.S. Cl.
CPC .......... *H04L 9/3247* (2013.01); *H04L 9/3263* (2013.01); *H04L 2209/463* (2013.01)

(56) References Cited

U.S. PATENT DOCUMENTS

| | | | |
|---|---|---|---|
| 2012/0239464 A1* | 9/2012 | Vicari | H04L 63/08 |
| | | | 705/12 |
| 2017/0109735 A1* | 4/2017 | Sheng | H04L 9/3297 |
| 2017/0109955 A1* | 4/2017 | Ernest | H04L 9/3073 |
| 2020/0074778 A1* | 3/2020 | Shapira | H04L 9/3213 |
| 2020/0219351 A1* | 7/2020 | Cho | G07C 13/00 |

FOREIGN PATENT DOCUMENTS

| | | |
|---|---|---|
| KR | 10-1075758 | 10/2011 |
| RU | 2 292 082 | 1/2007 |
| WO | 96/02044 | 1/1996 |
| WO | 2010/010430 | 1/2010 |

* cited by examiner

US 11,356,267 B2

APPARATUS, METHOD AND SOFTWARE FOR ELECTRONIC VOTING DURING WEB CONFERENCE

FIELD

Various embodiments relate to a user apparatus, a method and software for an electronic voting during a web conference.

BACKGROUND

Web conferencing is becoming very popular due to avoiding travelling, saving natural resources, reducing pollution, fighting a pandemic, etc. Voting is difficult to arrange during a web conference. Especially, it is hard to ensure voting secrecy, anonymity, privacy, transparency, security and correctness. Furthermore, voting rights may either be specific to a web conference, or for a plurality of issues coming up during the web conference. In some cases, an absolute requirement is that only those may vote who are present at the web conference during a voting time period.

BRIEF DESCRIPTION

According to an aspect, there is provided subject matter of independent claims. Dependent claims define some embodiments.

One or more examples of implementations are set forth in more detail in the accompanying drawings and the description of embodiments.

LIST OF DRAWINGS

Some embodiments will now be described with reference to the accompanying drawings, in which FIG. 1 and FIG. 2 illustrate embodiments of an electronic voting system;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Reference numbers, both in the description of the embodiments and in the claims, serve to illustrate the embodiments with reference to the drawings, without limiting it to these examples only.

The embodiments and features, if any, disclosed in the following description that do not fall under the scope of the independent claims are to be interpreted as examples useful for understanding various embodiments of the invention.

Figure 1:
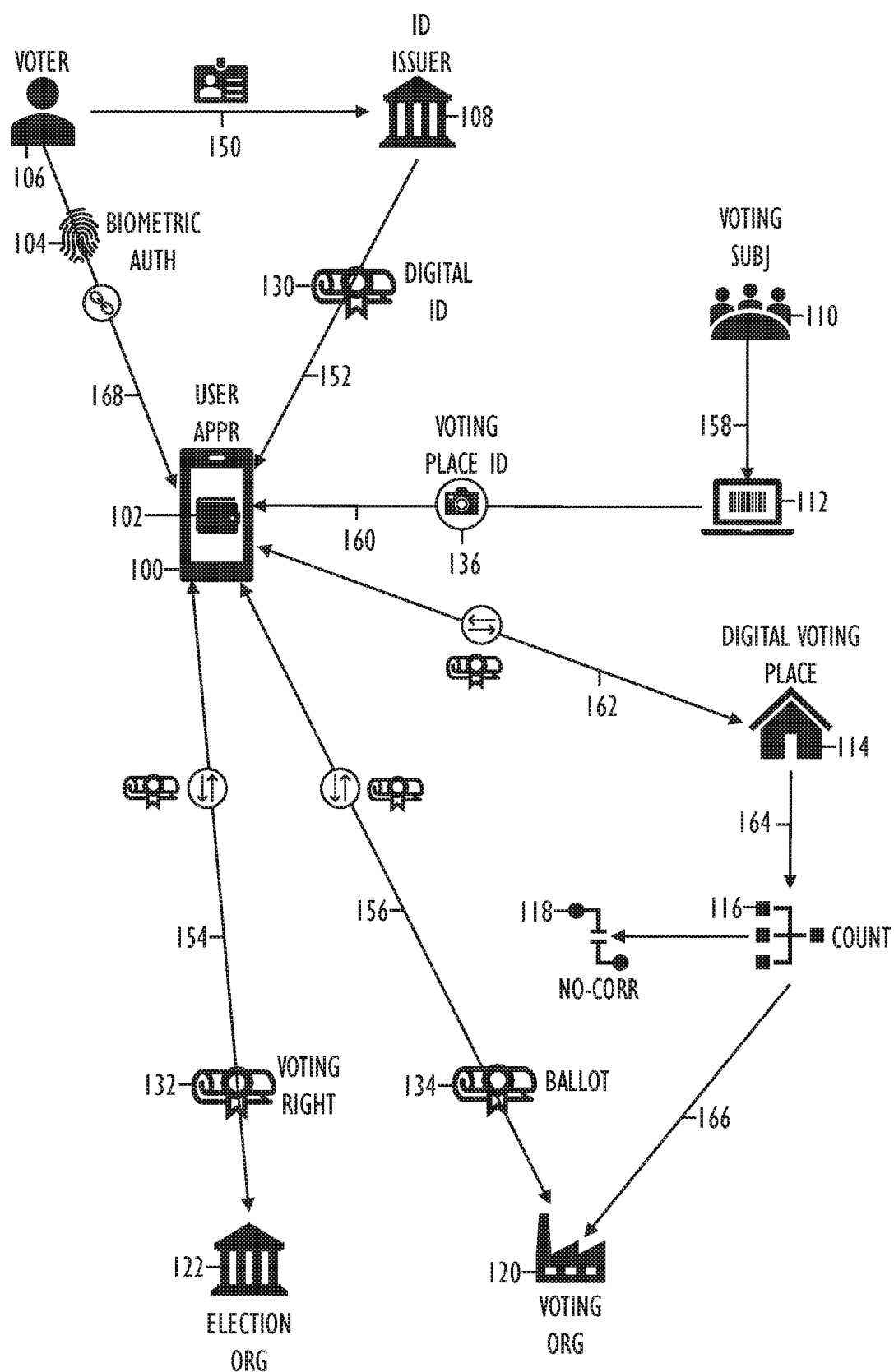
Figure 2:
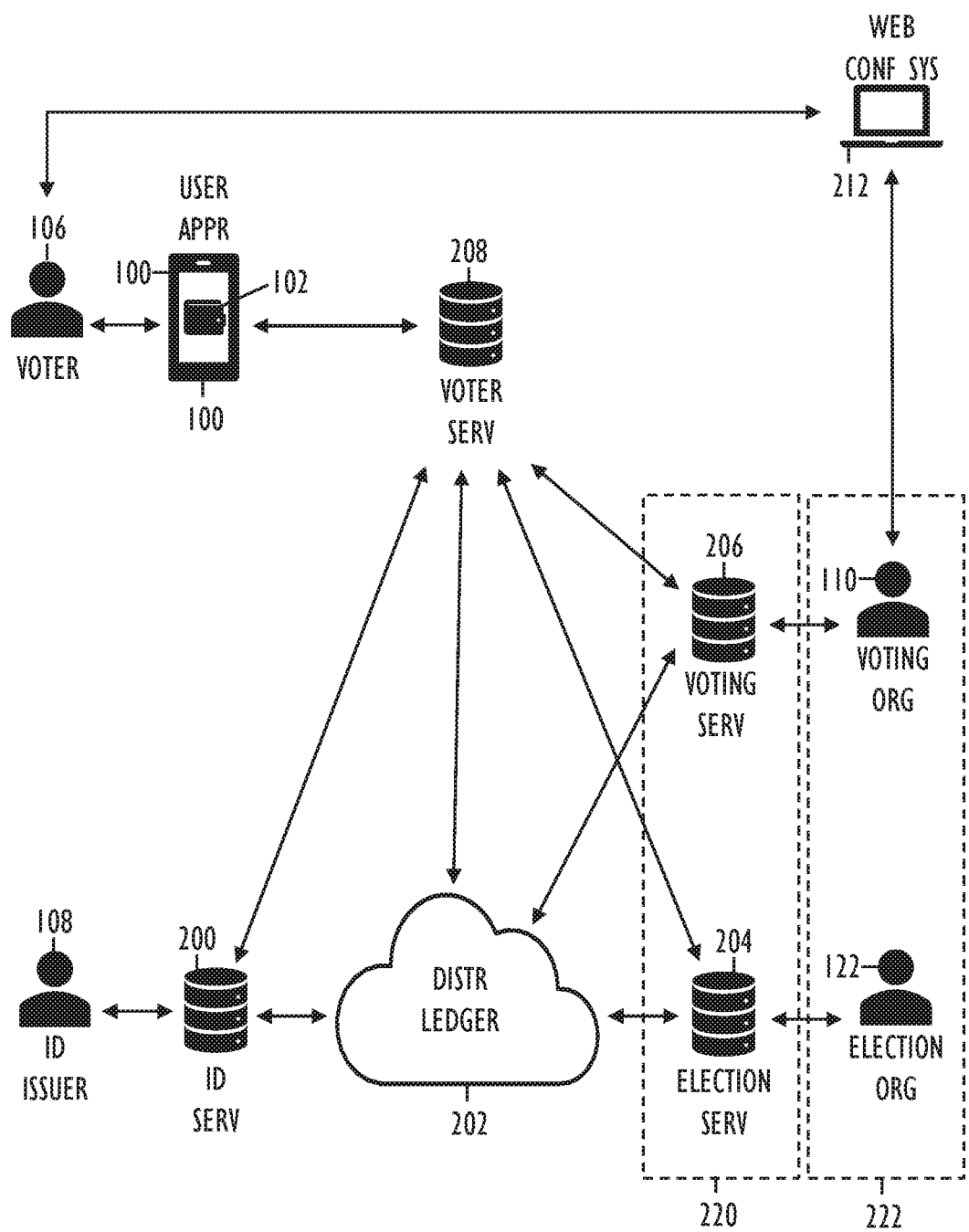
Figure 7:
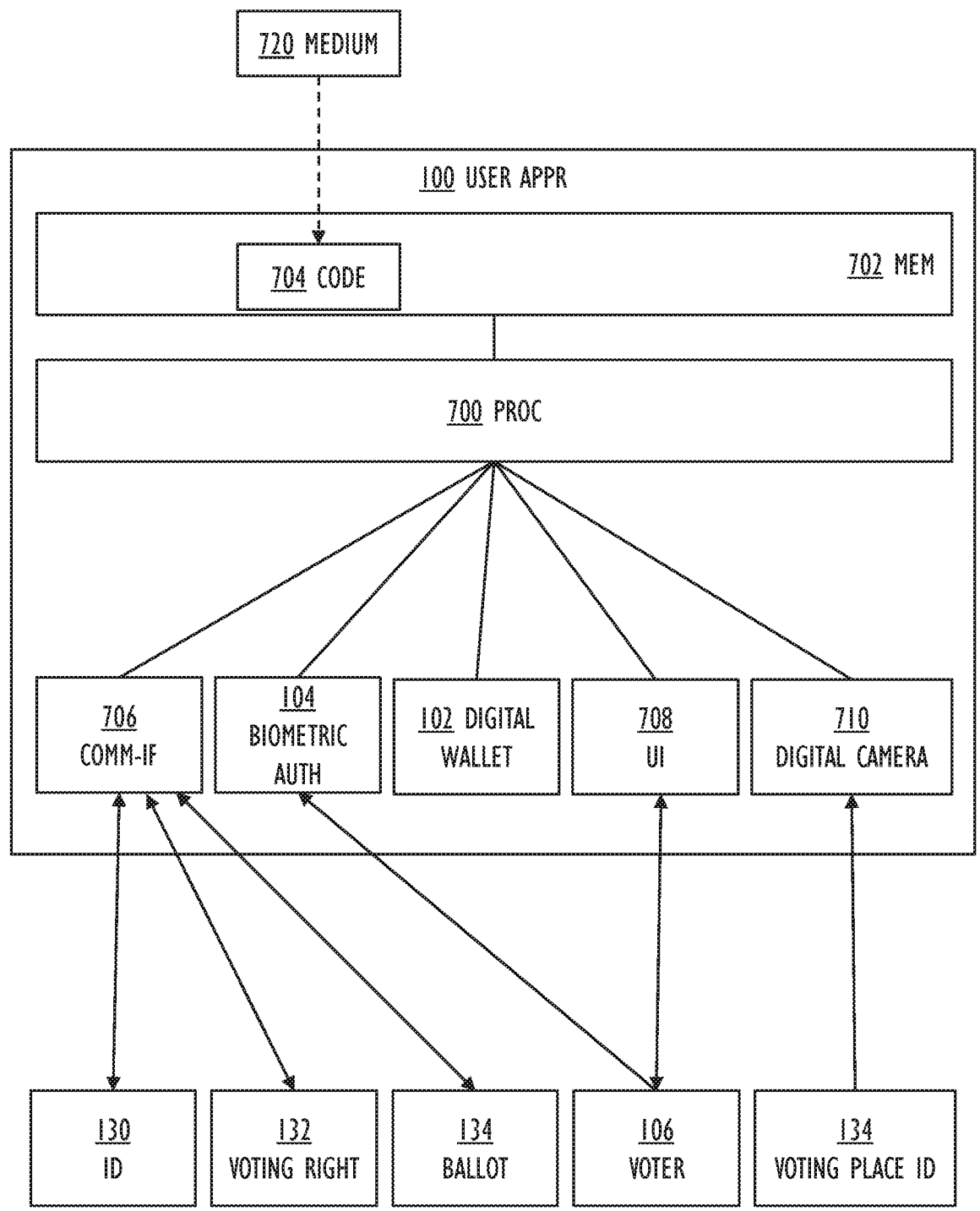
FIG. 7 illustrates embodiments of a user apparatus for the electronic voting.
Figure 8:
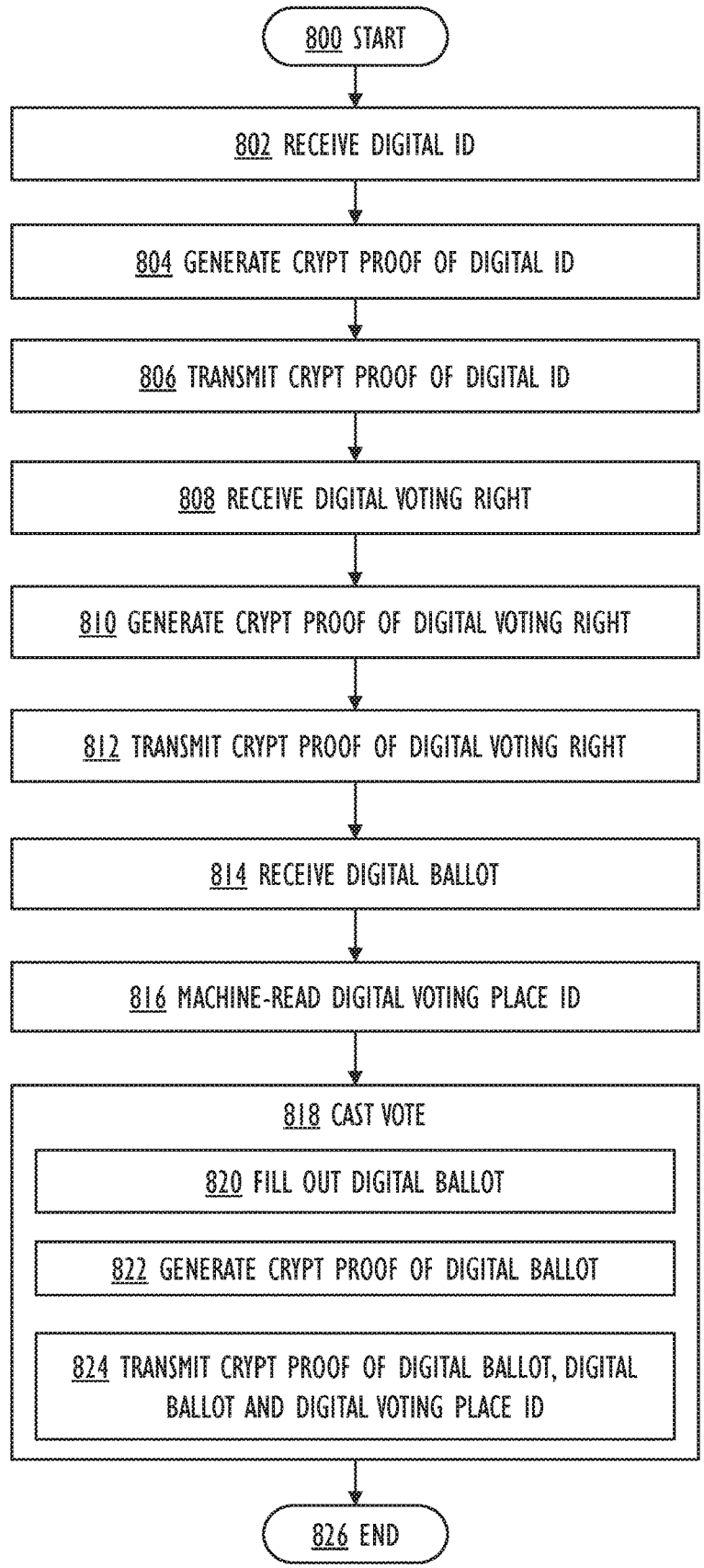
FIG. 8 is a flow-chart illustrating embodiments of a method for the electronic voting.

Let us study simultaneously FIG. 1 and FIG. 2, which illustrate embodiments of an electronic voting system, FIG. 7, which illustrates embodiments of a user apparatus 100, and FIG. 8, which illustrates embodiments of a method for an electronic voting during a web conference.

A voter 106 uses a user apparatus 100 for an electronic voting during a web conference.

The user apparatus 100 may be a computer, laptop computer, tablet computer, phablet, mobile phone, smartphone, smartwatch, general-purpose mobile computing device, or some other electronic apparatus enabling processing to be described for the electronic voting.

The user apparatus 100 comprises a digital wallet 102, a wireless communication interface 706, a biometric authentication device 104, a digital camera 710, a user interface 708, one or more memories 702 including computer program code 704, and one or more processors 700 to execute the computer program code 704.

The user apparatus 100 may be a general-purpose off-the-shelf computing device, as opposed to a purpose-build proprietary equipment, whereby research & development costs will be lower as only the special-purpose software (and not the hardware) needs to be designed, implemented and tested. A typical off-the-shelf smartphone, for example, includes all hardware and software implementing the wireless communication interface 706 (as a cellular radio transceiver, a WLAN transceiver and a Bluetooth transceiver), the biometric authentication device 104 (as a fingerprint scanner or a facial recognition device), the digital camera 710, the user interface 708 (as a touchscreen), one or more memories 702, and one or more processors 700.

The digital wallet 102 allows a user 106 to make electronic transactions, such as purchasing items online or at a store. A bank account or a payment card may be linked to the digital wallet 102. Personal information, such as a driver's license or a loyalty card may be stored in the digital wallet 102. The digital wallet 102 has strong security and encryption mechanisms for data security and privacy.

In an embodiment, the wireless communication interface 706 comprises one or more wireless radio transceivers configured to operate using one or more of the following: a cellular radio network, a wireless local area network (WLAN), or a short-range radio network (such as Bluetooth). In general, the wireless radio transceiver may be interoperable with various wireless standard/non-standard/proprietary cellular radio networks such as any mobile phone network, which may be coupled with a wired network such as the Internet.

The wireless radio transceiver may be implemented with a suitable cellular communication technology regardless of the generation (such as 2G, 3G, 4G, beyond 4G, 5G etc.) in their present forms and/or in their evolution forms, such as GSM, GPRS, EGPRS, WCDMA, UMTS, 3GPP, IMT, LTE, LTE-A, etc. and/or with a suitable non-cellular communication technology such as Bluetooth, Bluetooth Low Energy, Wi-Fi, WLAN, Zigbee, etc.

In an embodiment, the wireless radio transceiver is coupled to a subscriber identity module (SIM), which may be an integrated circuit storing subscriber data, which is network-specific information used to authenticate and identify the subscriber on the cellular network. The subscriber identity module may be embedded into a removable SIM card. The subscriber identity module may also be an embedded-SIM (eSIM), embedded directly into the user apparatus 100, and provisioned through software.

The biometric authentication device 104 verifies user identity by checking unique biological characteristics of the user 106. The biometric identification device implements "something you are"-part of the multi-factor authentication. In an embodiment, the biometric authentication device 104 uses fingerprint scanning or facial recognition, but also other applicable technologies including, but not limited to, retina scanning, or iris recognition may be used.

The digital camera 710 captures photographs in a digital camera. In order to read a machine-readable code, suitable software processes the photograph to extract data, by detecting a QR code from the photograph, for example.

The user interface 708 realizes the interaction with the user 106 by using suitable hardware and software, including, but not limited to, a (virtual) keyboard, one or more physical buttons, a touch-sensitive screen, a cursor pointing device, etc.

The term 'processor' 700 refers to a device that is capable of processing data. Depending on the processing power needed, the user apparatus 100 may comprise several processors 700 such as parallel processors, a multicore processor, or a computing environment that simultaneously utilizes resources from several physical computer units (sometimes these are referred as cloud, fog or virtualized computing environments). When designing the implementation of the processor 700, a person skilled in the art will consider the requirements set for the size and power consumption of the user apparatus 700, the necessary processing capacity, production costs, and production volumes, for example.

The one or more processors 700 of the user apparatus 100 may be implemented with one or more microprocessors 700, and one or more memories 702 including computer program code 704. The one or more memories 702 and the computer program code 704 are configured to, with the one or more processors 700, cause performance of the data processing operations of the user apparatus 100.

A non-exhaustive list of implementation techniques for the processor 700 and the memory 702 includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures.

The term 'memory' 702 refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

The computer program code 704 may be implemented by software. In an embodiment, the software may be written by a suitable programming language, and the resulting executable code may be stored in the memory 702 and run by the processor 700.

An embodiment provides a computer-readable medium 720 storing computer program code 704, which, when loaded into the one or more processors and executed by one or more processors 700, causes the one or more processors 700 to perform the computer-implemented method for the electronic voting during the web conference, which will be explained with reference to FIG. 8. The computer-readable medium 720 may comprise at least the following: any entity or device capable of carrying the computer program code 704 to the one or more processors 700, a record medium, a computer memory, a read-only memory, an electrical carrier signal, a telecommunications signal, and a software distribution medium. In some jurisdictions, depending on the legislation and the patent practice, the computer-readable medium 720 may not be the telecommunications signal. In an embodiment, the computer-readable medium 720 may be a computer-readable storage medium. In an embodiment, the computer-readable medium 720 may be a non-transitory computer-readable storage medium.

The computer program code 704 implements the algorithm for the electronic voting during the web conference. The computer program code 704 may be coded as a computer program (or software) using a programming language, which may be a high-level programming language, such as C, C++, or Java, or a low-level programming language, such as a machine language, or an assembler, for example. The computer program code 704 may be in source code form, object code form, executable file, or in some intermediate form. There are many ways to structure the computer program code 704: the operations may be divided into modules, sub-routines, methods, classes, objects, applets, macros, etc., depending on the software design methodology and the programming language used. In modern programming environments, there are software libraries, i.e. compilations of ready-made functions, which may be utilized by the computer program code 704 for performing a wide variety of standard operations. In addition, an operating system (such as a general-purpose operating system) may provide the computer program code 704 with system services.

In an embodiment, the one or more processors 700 may be implemented as one or more microprocessors implementing functions of a central processing unit (CPU) on an integrated circuit. The CPU is a logic machine executing the computer program code 704. The CPU may comprise a set of registers, an arithmetic logic unit (ALU), and a control unit (CU). The control unit is controlled by a sequence of the computer program code 704 transferred to the CPU from the (working) memory 702. The control unit may contain a number of microinstructions for basic operations. The implementation of the microinstructions may vary, depending on the CPU design.

Let us now study the algorithm/method with reference to FIG. 8.

The method starts in 800 and ends in 826. Note that the method may run as long as required (after the start-up of the apparatus 100 until switching off) by looping from an operation 822 back to an operation 804 or 810.

The operations are not strictly in chronological order in FIG. 8, and some of the operations may be performed simultaneously or in an order differing from the given ones. Other functions may also be executed between the operations or within the operations and other data exchanged between the operations. Some of the operations or part of the operations may also be left out or replaced by a corresponding operation or part of the operation. It should be noted that no special order of operations is required, except where necessary due to the logical requirements for the processing order. Note also that all operations need not be executed immediately after the previous one, but a time period of seconds, minutes, hours, days, months, or even years may be in between. For example, the digital identifier may first be obtained, and used in a plurality of different electronic votes for years to come.

In 802, a digital identifier 130 of the user 106 is received 152 with the wireless communication interface 706 into the digital wallet 102 from an identifier issuer server 200. The identifier issuer server 200 is operated by an identifier issuer organization such as a public authority. It may be required that the user 106 is physically present and shows 150 a valid proof of identity such as a personal card, driver's license or a passport, for example, and only after that the identifier issuer server 200 transmits the digital identifier 130. In any case, this is an important operation, where the user 106 must show that s/he is really the holder of the proof of identity and holder of the digital wallet 102, which will receive the digital identifier 130. A strong customer authentication may be coupled with this operation to ensure that the digital wallet 102 is of the right person 106. For example, a bank authentication method or a credit card may be tied with the digital wallet 102. Another alternative is that the digital wallet 102 has beforehand been tied to the user 106 with the bank authentication method, for example, and the digital wallet 102 is used with the multi-factor authentication including an authentication of the user 106 with the biometric authentication device 104 during the reception of the digital identifier 130 from the identifier issuer server 200. In 804, a cryptographical proof of the digital identifier 130 is generated. The proof of the digital identifier 130 may be generated by computing a mathematical and cryptographical proof.

In 806, the cryptographical proof of the digital identifier 130 is transmitted to an election organizer server 204.

In 808, a digital voting right 132 is received 154 with the wireless communication interface 706 into the digital wallet 102 from the election organizer server 204 in response to generating and transmitting the cryptographical proof of the digital identifier 130 to the election organizer server 204.

In 810, a cryptographical proof of the digital voting right 132 is generated.

In 812, the cryptographical proof of the digital voting right 132 is transmitted to a voting organizer server 206.

In 814, a digital ballot 134 is received 156 into the digital wallet 102 with the wireless communication interface 706 from the voting organizer server 206 in response to generating and transmitting the cryptographical proof of the digital voting right 132 to the voting organizer server 206.

In 816, a digital voting place identifier 136 is read 160 with the digital camera 710 from a machine-readable code during a web conference. A possible use case: a chairman 110 of a meeting presents 158 a case identifier (voting subject) as a safe QR code (or with another machine-readable code technology) to participants including the user 106. The QR code may be made safe by having a short expiration time or another mechanism, which prohibits unauthorized distribution of the QR code from one user to another. The participants obtain the digital voting place identifier 136 from the QR code. If a participant leaves the meeting before the digital voting place identifier 136 is published, voting may not be possible, which may be a requirement depending on the legislation.

In an embodiment, a trigger is received from a web conference application 212 during the web conference to initiate reading of the digital voting place identifier 136.

In an embodiment, the digital voting place identifier 136 is read with the digital camera 710 from the machine-readable code 112 during the web conference so that the machine-readable code 112 is read from a display of the machine-readable code in a digital voting place 114 of the web conference.

In 818, a vote is cast 162, 164, with the user interface 708 and the wireless communication interface 706, by filling out 820 the digital ballot 134, generating 822 a cryptographical proof of the digital ballot 134 and transmitting 162, 824 the cryptographical proof of the digital ballot 134, the digital ballot 134 and the digital voting place identifier 136 to the voting organizer server 206 acting as a digital voting place 114.

Only when the digital wallet 102 of the user 106 holds the correct digital ballot 134 and the digital voting place identifier 136, is voting possible. Each digital ballot 134 can be used only once. That is an atomic transaction. Voting results may be calculated 116 or invalidated 118 in real-time by the voting organizer server 206, and the voting result may be informed 166 to the voting organizer 120.

The digital wallet 102 is used with a multi-factor authentication including an authentication of the user 106 with the biometric authentication device 104.

In an embodiment, the multi-factor authentication also includes inputting a code known only to the user 106. Also, other authentication factors of the multi-factor authentication may be used to increase security, such as requiring the user to possess a specific physical object such as the user apparatus 100 or requiring the user 106 to be in a specific location.

In an embodiment, the user apparatus 100 communicates via a voter server 208 with the identifier issuer server 200, the election organizer server 234, and the voting organizer server 206. The voter server 208 may serve a plurality of voters 106. The voter server 208 may be tailored to augment the existing services of the digital wallet 102 with the electronic voting functionality.

Note that the voter server 208, the identifier issuer server 200, the election organizer server 234, and the voting organizer server 206 may be implemented as separate servers, but depending on the system design, two or more of them may be more or less integrated.

Each server 200, 206, 208, 234 may be implemented as a networked computer server, which interoperates with other actors of the electronic voting system according to a client-server architecture, a cloud computing architecture, a peer-to-peer system, or another applicable distributed computing architecture.

In an embodiment, the digital identifier 130 is received, the digital voting right 132 is received, the digital ballot 134 is received, the digital voting place identifier 136 is read and the vote is cast in an application that is separate from a web conference application 212 implementing the web conference. For example, the voting application is running in the user apparatus 100 and the voter server 208, whereas the web conference application 212 is a different application such as Microsoft® Teams running in another apparatus, such as a portable computer or a pad used by the voter 106. In an embodiment, the voting application and the web conference application 212 are both running in the user apparatus 100.

The digital identifier 130 of the user 106, the digital voting right 132 and the digital ballot 134 are processed as verifiable credentials. Verifiable credentials (VCs) are the electronic equivalent of the physical credentials (a plastic card, passport, or driving licenses, for example). The data model for verifiable credentials is a World Wide Web Consortium (W3C) Recommendation, "Verifiable Credentials Data Model 1.0—Expressing verifiable information on the Web" published 19 Nov. 2019. The holder of a verifiable credential is at the center of a triangle of trust, mediating between an issuer and a verifier. The issuer and the holder trust each other, the holder trusts the verifier, and the verifier trusts the issuer.

Note that the voting organizer 120 and the election organizer 122 may be different entities, or the same entity. Consider, for example a situation, wherein an organization (such as a company, a government agency, or a non-governmental organization, for example) acts as the election organizer 122, and a plurality of members of that organization acts as the voting organizers 120 for numerous different meetings. Or, alternatively, the organization is so small and only has a very limited number of meetings with a voting, so that the election organizer 122 and the voting organizer 120 are effectively the same organization 222. Accordingly, the election organizer server 204 and the voting organizer server 206 may also logically be one and only server 220. The digital voting right 132 may be given to the voter 106 as an individual, or the digital voting right 132 is given to a role (such as for a certain organizational position) attached to the voter 132.

In an embodiment, the digital voting right 132 and the digital ballot 134 are processed without attaching any unencrypted data of the digital identifier 130 of the user 106.

Figure 3:
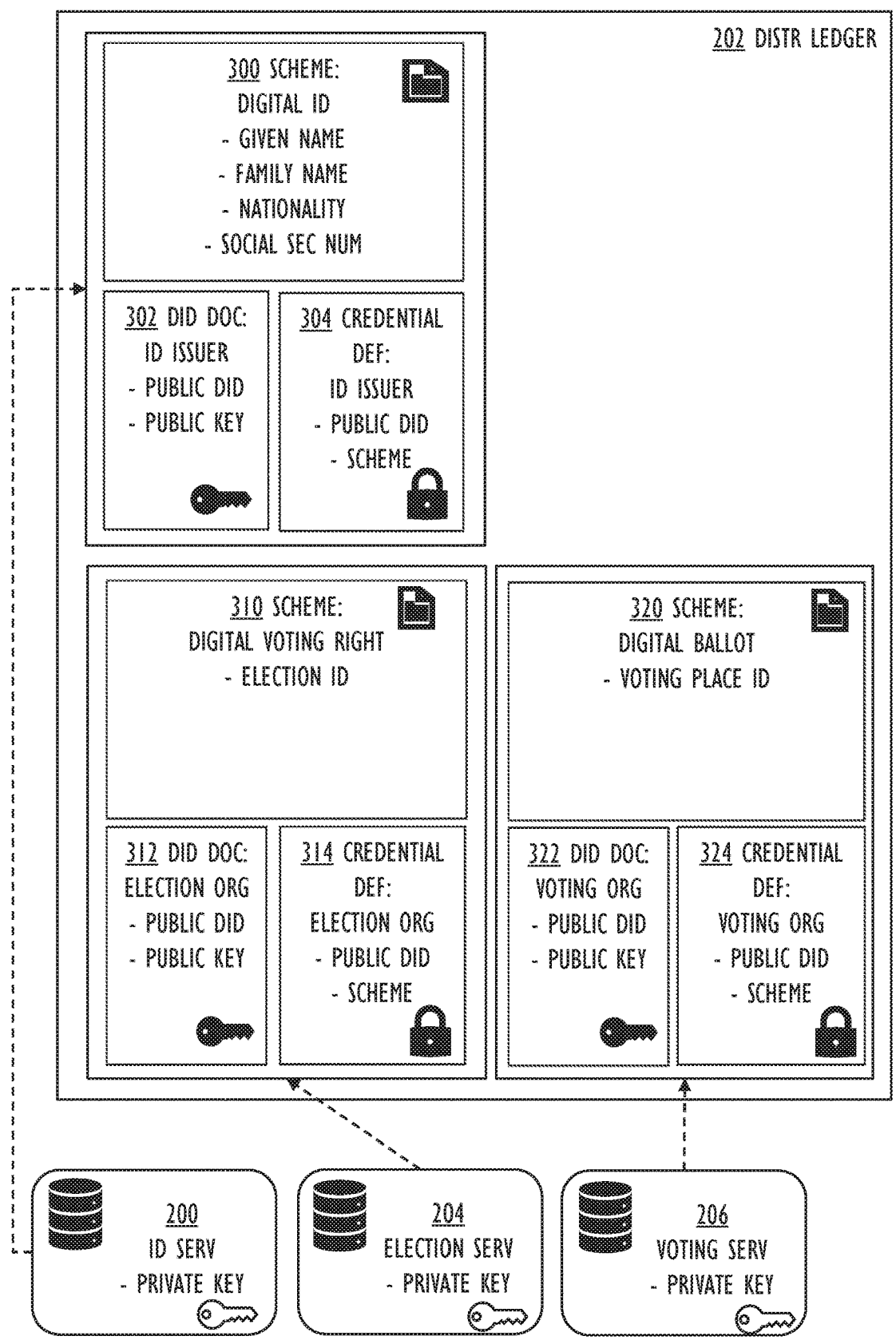
FIG. 3 illustrates embodiments of data structures of the electronic voting.

In an embodiment illustrated in FIG. 3 the digital identifier 130 of the user 106, the digital voting right 132 and the digital ballot 134 are processed as verifiable credentials so that each each of them is a cryptographically constructed document and digitally signed by an issuer and countersigned by the digital wallet. Because verifiable credentials for the digital voting right 132 and the digital ballot 134 do not include information of the voter 106, the voting privacy is guaranteed. The credential proof itself cannot be compromised if the digital wallet 102 is not compromised. The digital wallet 102 is protected by the biometric multi-factor authentication.

The verifiable credentials hold metadata that is used to set requirements for authentication methods: when authentication should be performed and what type of authentication should be applied, for example.

The voting system trust is established through verifiable credentials model. The authorities 108, 120, 122 issue the verifiable credentials to the digital wallet 102 of the voter 106 and each verifiable credential provides a verifiable presentation of the credential to verifiers.

The verifiable credentials are cryptographically constructed documents. They are JSON (JavaScript Object Notation) documents, constructed and digitally signed by an issuer and countersigned by the holder. When a verifier receives a presentation from a credential holder, they use information from a distributed ledger 202 to perform cryptographic calculations necessary to prove who issued the verifiable credential, that the verifiable credential was issued to the holder presenting it, that the claims of the verifiable credential are not tampered with, and that the verifiable credential has not been revoked.

Thus, the distributed ledger 202 works as a verifiable data registry. The distributed ledger 202 contains the cryptographic keys and identifiers enabling the verifiable credentials model.

The voting system has three services that issue verifiable credentials relevant for voting process. The identifier issuer 108 issues the digital identifier 130 to the voter 106. The voter 106 uses the digital identifier credential to register for the election: the election organizer 122 verifies the digital identifier credential and issues the digital voting right 132 to the voter 106. The voting organizer 120 verifies the digital voting right credential and issues the digital ballot credential.

The servers 200, 204, 206 create the following entries to the distributed ledger 202: a DID document 302 stating the public identifier and verification key for the issuer, a credential scheme describing data fields the credential contains, and a credential definition describing the schema the credential uses and the DID and keys the issuer uses to sign the claims of the credential.

Figure 4:
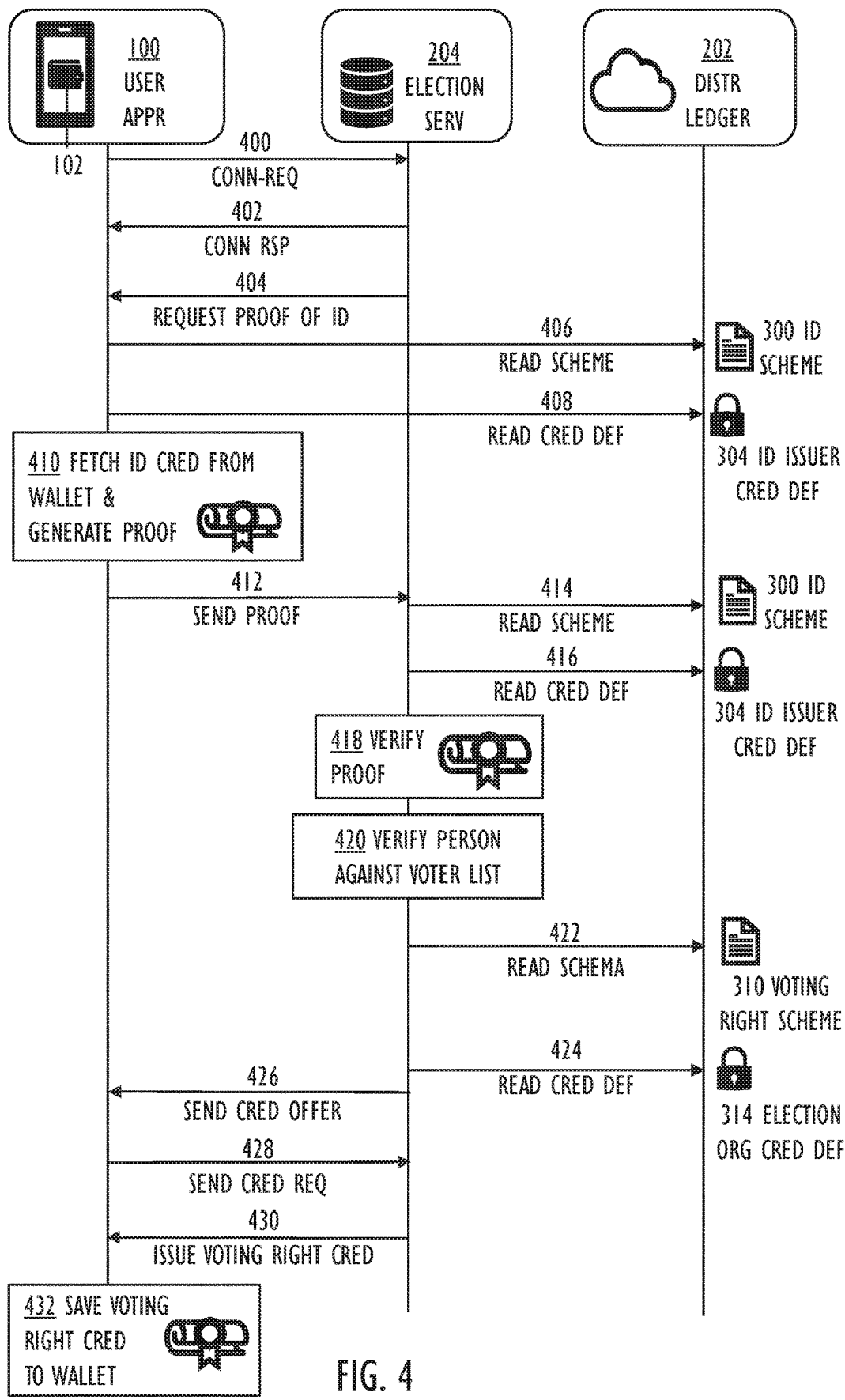
FIG. 4, FIG. 5 and FIG. 6 are signal sequence charts illustrating embodiments of communication of the electronic voting.
Figure 5:
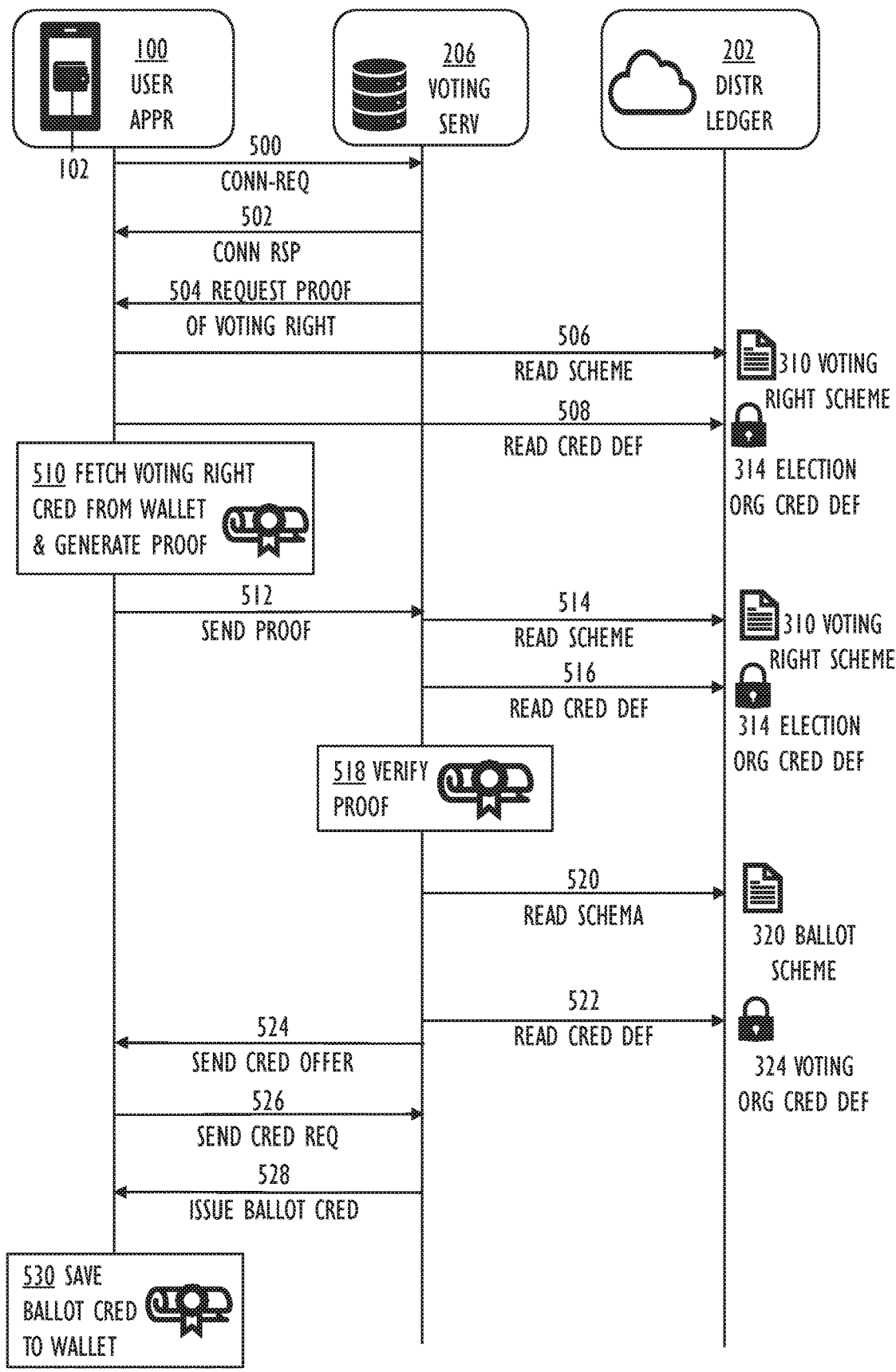
Figure 6:
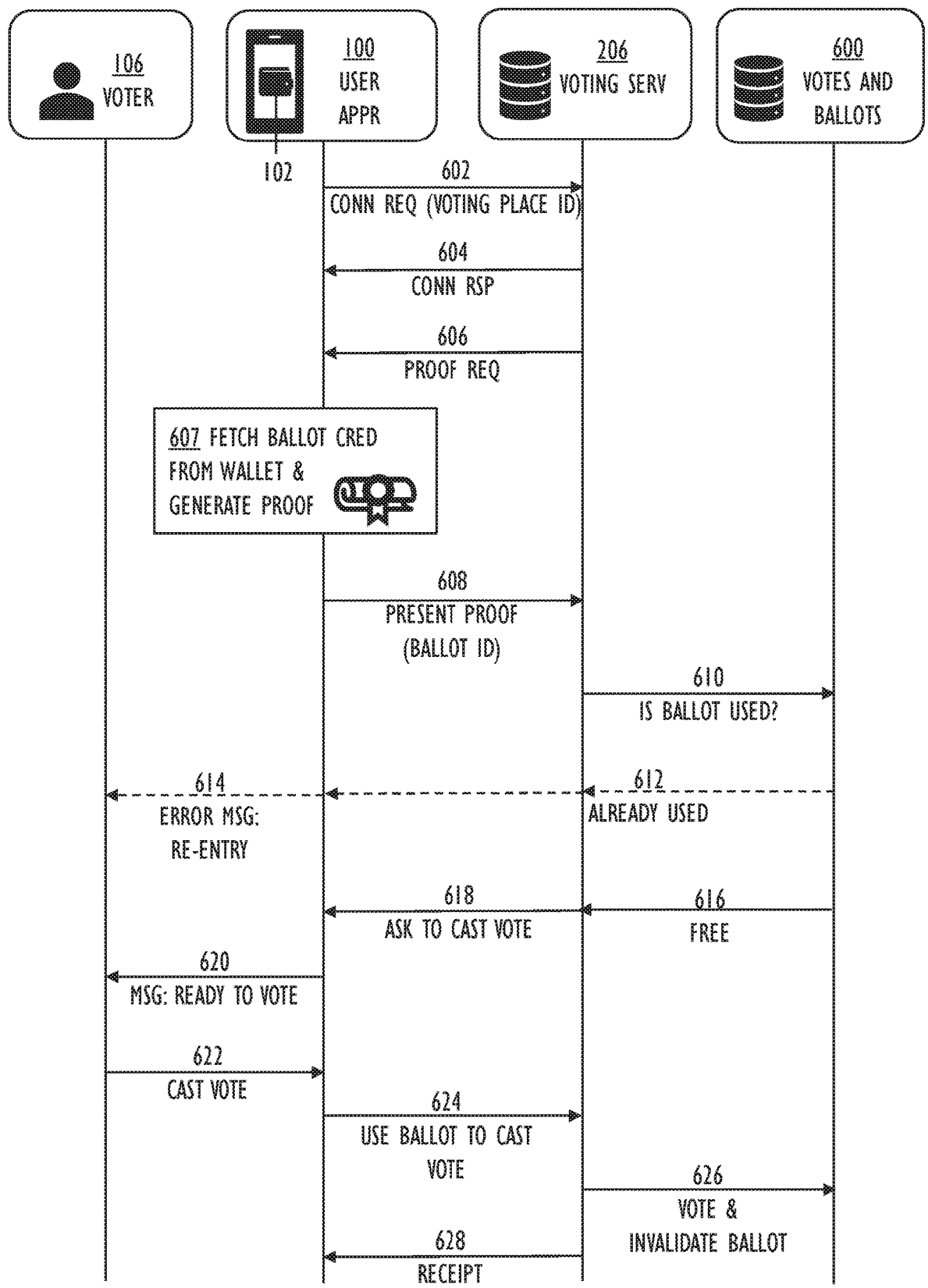

FIG. 4, FIG. 5 and FIG. 6 are signal sequence charts illustrating embodiments of communication of the electronic voting.

In FIG. 4, processing related to the digital voting right is illustrated. The user apparatus 100 sends 400 a connect request to the election organizer server 204 and receives 402 a connection response. The connection request and the connection response may build a so-called DIDComm connection. DIDComm (short for DID Communication) is an emerging messaging standard defining valid semantics for DIDComm messages, thereby providing the basis for implementing DIDComm protocols such as credential exchange etc. The focus of the DIF (Decentralized Identity Foundation) DIDComm Working Group is to evolve the work of the Hyperledger Aries community and reach a standardized secure messaging protocol built atop of DIDs. Here, the use of DID Comm enables the user apparatus 100 to verify that it is really communicating with the election organizer server 204 of the proper organization. When the user apparatus 100 receives the connection response, it checks that the DID document matches the DID of the proper and legitimate election organization 122. After this, the election organizer server 204 requests 404 a proof of the identifier from the user apparatus 100. The user apparatus 100 reads 406 the digital identifier scheme 300 and also reads 408 the digital identifier credential definition 304, both from the distributed ledger 202. Then, the user apparatus 100 fetches 410 the digital identifier credential from the digital wallet 102 and generates a proof, after which the user apparatus 100 sends 412 the proof to the election organizer server 204. The election organizer server 204 reads 414 the digital identifier scheme 300 and also reads 416 the digital identifier credential definition 304, both from the distributed ledger 202. After this, the election organizer server 204 verifies 418 the proof, and verifies 420 that the voter 106 is found on a list of eligible voters. The election organizer server 204 reads 422 the digital voting right scheme 310 and also reads 424 the digital voting right credential definition 314, both from the distributed ledger 202. Then, the election organizer server 204 sends 426 a credential offer to the user apparatus 100. In response, the user apparatus 100 sends 428 a credential request to the election organizer server 204. Finally, the election organizer server 204 issues 430 the digital voting right credential, which is saved 432 to the digital wallet 102 of the user apparatus 100. As needed, the user apparatus 100 fetches the digital voting right credential from the digital wallet 102 and generates a proof of it.

In FIG. 5, processing related to the digital ballot is illustrated. The user apparatus 100 sends 500 a connect request to the voting organizer server 206 and receives 502 a connection response. After this, the voting organizer server 206 requests 504 a proof of voting right from the user apparatus 100. The user apparatus 100 reads 506 the digital voting right scheme 310 and also reads 508 the digital voting right credential definition 314, both from the distributed ledger 202. Then, the user apparatus 100 fetches 510 the digital voting right credential from the digital wallet 102 and generates a proof, after which the user apparatus 100 sends 512 the proof to the voting organizer server 206. The voting organizer server 206 reads 514 the digital voting right scheme 310 and also reads 516 the digital voting right credential definition 314, both from the distributed ledger 202. After this, the voting organizer server 206 verifies 518 the proof. The voting organizer server 206 reads 520 the digital ballot scheme 320 and also reads 522 the digital ballot credential definition 324, both from the distributed ledger 202. Then, the voting organizer server 206 sends 524 a credential offer to the user apparatus 100. In response, the user apparatus 100 sends 526 a credential request to the voting organizer server 206. Finally, the voting organizer server 206 issues 528 the digital ballot right credential, which is saved 530 to the digital wallet 102 of the user apparatus 100. As needed, the user apparatus 100 fetches the digital ballot credential from the digital wallet 102 and generates a proof of it.

In FIG. 6, the voter 106 is ready to cast vote. The user apparatus 100 sends 602 a connect request using the voting place identifier to the voting organizer server 206 and receives 604 a connection response. The voting organizer server 206 sends 606 a proof request to the user apparatus 100, and, in response, the user apparatus 100 fetches 607 the digital ballot credential from the digital wallet 102, and generates a proof, and presents 608 the proof of the digital ballot. The voting organizer server 206 checks from a votes and ballots database 600 whether the digital ballot is already used. The votes and ballots database 600 may be implemented as a distributed ledger, but also using other database technologies. If the digital ballot is already used, the voting organizer server 206 informs 612 the user apparatus 100, and the user interface of the user apparatus 100 shows an error message to the voter 106. Else, if the digital ballot is free 616 for voting, the voting organizer server 206 asks 618 the user apparatus 100 to vote, and the user interface of the user apparatus 100 shows a ready to vote-message to the voter 106. The voter 106 then casts 622 the vote via the user interface of the user apparatus 100, and the user apparatus 100 transmits the digital ballot and other information as earlier described in operations 822 and 824. The voting organizer server 206 adds 626 the vote to the votes and ballots database 600 and invalidates the ballot. Finally, the voting organizer server 206 sends 628 a receipt of the voting to the user apparatus 100.

In an embodiment, ARIES (Algorithms for Recovery and Isolation Exploiting Semantics) protocol is used to carry the verifiable credentials from the issuer to the holder, and from the holder to the verifier.

Each decentralized identifier (DID) document 302, 312, 322 contains information related to a specific DID:
  a public DID and a public key of the identification issuer 108,
  a public DID and a public key of the election organizer 122, and
  a public DID and a public key of the voting organizer 120.

The decentralized identifier (DID) is a portable URL-based identifier associated with an entity. An example of a DID is did:example:123456abcdef.

Each credential 304, 314, 324 is a set of one or more claims made by an issuer. The claim is an assertion made about a subject. A verifiable credential is a tamper-evident credential that has authorship that can be cryptographically verified. Verifiable credentials may be used to build verifiable presentations, which may also be cryptographically verified. The claims in a credential may be about different subjects defined in a scheme 300, 310, 320:

scheme 300 of the digital identifier 130 contains a given name, a family name, a nationality, a social security number, for example, but it may additionally, or instead of, also contain other information of the user 106, scheme 310 of the digital voting right 132 contains an election identifier, but it may additionally contain other information related to the digital voting right 132, and scheme 320 of the digital ballot 134 contains a voting place identifier 136, but it may additionally contain other information related to the digital ballot 134.

In an embodiment illustrated in FIG. 2, the digital identifier 130 of the user 106, the digital voting right 132 and the digital ballot 134 are processed as verifiable credentials in connection with a distributed ledger (also called a shared ledger or distributed ledger technology or DLT) 202 enabling performance of cryptographic calculations necessary to prove who issued the verifiable credentials, that the verifiable credentials were issued to the holder presenting it, that the claims of the verifiable credentials are not tampered with, and that the verifiable credentials have not been revoked.

In an embodiment, the distributed ledger 202 is implemented as an immutable blockchain. The blockchain may be defined as a growing list of records (blocks), which re linked using cryptography. Each block contains a cryptographic hash of the previous block, a timestamp, and transaction data (encoded into a hash tree or a Merkle tree). The blockchain an open, distributed ledger that can record transactions between two parties efficiently and in a verifiable and permanent way.

In an embodiment, the digital identifier 130, the digital voting right 132 and the digital ballot 134 are processed using decentralized identifier (DID) documents containing a public DID, a public encryption key of a decentralized public key infrastructure (DPKI), and a scheme.

Even though the invention has been described with reference to one or more embodiments according to the accompanying drawings, it is clear that the invention is not restricted thereto but can be modified in several ways within the scope of the appended claims. All words and expressions should be interpreted broadly, and they are intended to illustrate, not to restrict, the embodiments. It will be obvious to a person skilled in the art that, as technology advances, the inventive concept can be implemented in various ways.

The invention claimed is:

1. A user apparatus for an electronic voting during a web conference, comprising:
  a digital wallet;
  a wireless communication interface;
  a biometric authentication device;
  a digital camera;
  a user interface;
  one or more memories including computer program code; and
  one or more processors to execute the computer program code to cause the electronic user apparatus to perform at least the following:
  receiving, with the wireless communication interface, a digital identifier of a user into the digital wallet from an identifier issuer server;
  receiving, with the wireless communication interface, a digital voting right into the digital wallet from an election organizer server in response to generating a cryptographical proof of the digital identifier and transmitting the cryptographical proof of the digital identifier to the election organizer server;

receiving, with the wireless communication interface, a digital ballot into the digital wallet from a voting organizer server in response to generating a cryptographical proof of the digital voting right and transmitting the cryptographical proof of the digital voting right to the voting organizer server;

reading, with the digital camera, a digital voting place identifier from a machine-readable code during a web conference; and casting a vote, with the user interface and the wireless communication interface, by filling out the digital ballot, generating a cryptographical proof of the digital ballot and transmitting the cryptographical proof of the digital ballot, the digital ballot and the digital voting place identifier to the voting organizer server;

wherein the digital wallet is used with a multi-factor authentication including an authentication of the user with the biometric authentication device, and wherein the digital identifier of the user, the digital voting right and the digital ballot are processed as verifiable credentials.

2. The apparatus of claim 1, wherein the multi-factor authentication also includes inputting a code known only to the user.

3. The apparatus of claim 1, wherein the apparatus is caused to perform:
processing the digital voting right and the digital ballot without attaching any unencrypted data of the digital identifier of the user.

4. The apparatus of claim 1, wherein the apparatus is caused to perform:
processing the digital identifier of the user, the digital voting right and the digital ballot as verifiable credentials so that each each of them is a cryptographically constructed document, and digitally signed by an issuer and countersigned by the digital wallet.

5. The apparatus of claim 1, wherein the apparatus is caused to perform:
processing the digital identifier of the user, the digital voting right and the digital ballot as verifiable credentials in connection with a distributed ledger enabling performance of cryptographic calculations necessary to prove who issued the verifiable credentials, that the verifiable credentials were issued to the holder presenting it, that the claims of the verifiable credentials are not tampered with, and that the verifiable credentials have not been revoked.

6. The apparatus of claim 5, wherein the distributed ledger is implemented as an immutable blockchain.

7. The apparatus of claim 1, wherein the apparatus is caused to perform:
processing the digital identifier, the digital voting right and the digital ballot using decentralized identifier (DID) documents containing a public DID, a public encryption key of a decentralized public key infrastructure (DPKI), and a scheme.

8. The apparatus of claim 1, wherein the apparatus is caused to perform:
receiving a trigger from a web conference application during the web conference to initiate reading of the digital voting place identifier.

9. The apparatus of claim 1, wherein the apparatus is caused to perform:
reading, with the digital camera, the digital voting place identifier from the machine-readable code during the web conference so that the machine-readable code is read from a display of the machine-readable code in a digital voting place of the web conference.

10. The apparatus of claim 1, wherein the apparatus is caused to perform:
communicating via a voter server with the identifier issuer server, the election organizer server, and the voting organizer server.

11. The apparatus of claim 1, wherein the digital identifier is received, the digital voting right is received, the digital ballot is received, the digital voting place identifier is read and the vote is cast in an application that is separate from a web conference application implementing the web conference.

12. A method for an electronic voting during a web conference, comprising:
receiving a digital identifier of a user into a digital wallet;
receiving a digital voting right into the digital wallet in response to generating a cryptographical proof of the digital identifier and transmitting the cryptographical proof of the digital identifier;
receiving a digital ballot into the digital wallet in response to generating a cryptographical proof of the digital voting right and transmitting the cryptographical proof of the digital voting right;
machine-reading a digital voting place identifier from a machine-readable code during a web conference; and
casting a vote by filling out the digital ballot, generating a cryptographical proof of the digital ballot and transmitting the cryptographical proof of the digital ballot, the digital ballot and the digital voting place identifier;
wherein the digital wallet is used with a multi-factor authentication including an authentication of the user with the biometric authentication device, and wherein the digital identifier of the user, the digital voting right and the digital ballot are processed as verifiable credentials.

13. The method of claim 12, wherein the multi-factor authentication also includes inputting a code known only to the user.

14. The method of claim 12, further comprising:
processing the digital voting right and the digital ballot without attaching any unencrypted data of the digital identifier of the user.

15. The method of claim 12, further comprising:
processing the digital identifier of the user, the digital voting right and the digital ballot as verifiable credentials so that each each of them is a cryptographically constructed document, and digitally signed by an issuer and countersigned by the digital wallet.

16. The method of claim 12, further comprising:
processing the digital identifier of the user, the digital voting right and the digital ballot as verifiable credentials in connection with a distributed ledger enabling performance of cryptographic calculations necessary to prove who issued the verifiable credentials, that the verifiable credentials were issued to the holder presenting it, that the claims of the verifiable credentials are not tampered with, and that the verifiable credentials have not been revoked.

17. The method of claim 12, further comprising:
processing the digital identifier, the digital voting right and the digital ballot using decentralized identifier (DID) documents containing a public DID, a public encryption key of a decentralized public key infrastructure (DPKI), and a scheme.

18. The method of claim 12, further comprising:
receiving a trigger from a web conference application during the web conference to initiate reading of the digital voting place identifier.

19. The method of claim 12, further comprising:
reading the digital voting place identifier from the machine-readable code during the web conference so that the machine-readable code is read from a display of the machine-readable code in a digital voting place of the web conference.

20. A non-transitory computer-readable medium comprising computer program code, which, when loaded into one or more processors and executed by the one or more processors, causes an apparatus to perform a method for an electronic voting during a web conference comprising:

receiving a digital identifier of a user into a digital wallet;

receiving a digital voting right into the digital wallet in response to generating a cryptographical proof of the digital identifier and transmitting the cryptographical proof of the digital identifier;

receiving a digital ballot into the digital wallet in response to generating a cryptographical proof of the digital voting right and transmitting the cryptographical proof of the digital voting right;

machine-reading a digital voting place identifier from a machine-readable code during a web conference; and casting a vote by filling out the digital ballot, generating a cryptographical proof of the digital ballot and transmitting the cryptographical proof of the digital ballot, the digital ballot and the digital voting place identifier;

wherein the digital wallet is used with a multi-factor authentication including an authentication of the user with the biometric authentication device, and wherein the digital identifier of the user, the digital voting right and the digital ballot are processed as verifiable credentials.

* * * * *